United States Patent Office 3,452,123
Patented June 24, 1969

3,452,123
PROCESS FOR THE MANUFACTURE OF CROSS-LINKED ETHYLENE POLYMER FOAMS
Rolf Beckmann, Siegburg, Karl-Heinz Kleefisch, Bonn, and Wolfgang Dobrikat, Troisdorf, Germany, assignors to Dynamit Nobel Aktiengesellschaft, Troisdorf, near Cologne, Germany, a corporation of Germany
No Drawing. Filed Aug. 13, 1964, Ser. No. 389,474
Claims priority, application Germany, Aug. 30, 1963, D 42,372
Int. Cl. B29d 27/00; B29h 7/20
U.S. Cl. 264—53                                 8 Claims

ABSTRACT OF THE DISCLOSURE

Continuous manufacture of ethylene polymer-containing foams by continuous extrusion of a mixture of ethylene polymer-containing material, propellant and cross-linking agent in the presence of an organic solvent for ethylene polymer, e.g. having a boiling point above about 40° C., optionally in admixture with a filler.

---

The present invention relates to a process for the manufacture of cross-linked ethylene polymer foams, and more particularly to a process for the continuous manufacture of ethylene polymer-containing foams by the extrusion of ethylene polymer-containing material in admixture with propellants and cross-linking agents, and in the additional presence of an organic solvent for ethylene polymer.

It is known that it is possible to manufacture foams of thermoplastic materials with gas-yielding propellants or blowing agents, so as to obtain an open-pored or closed-pored cellular body, depending upon the procedure utilized. On the one hand, the foamable mass is put into a closed mold, such mold is then heated in a press under specific conditions, and then the mold is cooled slowly again, so that the foam body which has been formed can be removed from the mold. On the other hand, the mass in the mold is heated with the simultaneous application of pressure, until the decomposition of the propellant or blowing agent used is complete, and then the mass is cooled again under pressure. The gas-containing molded body is thereafter brought to a temperature at which the thermoplastic material can flow sufficiently well, in order to yield to the gas pressure in the interior of the material and cause the desired foaming action to be completed.

A cellular body can be obtained also by causing the foaming mass to swell up in an open vessel under the influence of temperature. These processes, however, are uneconomical, due to the need for careful temperature control over relatively long heating and cooling periods.

It is known furthermore that the heating and cooling periods can be eliminated in the manufacture of thermoplastic foams if the thermoplastic materials used can be cross-linked. In such cases, the foamable mass is made to foam up in an open vessel at elevated temperature, or is treated under pressure in a heated press and foamed when the press is opened. An open-celled or closed-celled body is obtained depending upon the method of production and the cross-linking and propellant system utilized.

It has been proposed already as well to manufacture thermally, mechanically and chemically resistant, non-brittle plastic foams by adding to polyethylene or ethylene copolymers radical formers, preferably organic peroxides, and propellants or blowing agents, and then heating these mixtures to temperatures at which the propellants and cross-linking agents become active.

In the extrusion of polyethylene and/or ethylene copolymers containing cross-linking agents, such as peroxides, however, the difficulty usually occurs that the polyethylene and/or ethylene copolymers become vulcanized long before they emerge from the die of the extruder, and therefore they are no longer sufficiently capable of flowing in the desired manner. In the case of those appropriate peroxides heretofore utilized for the cross-linking of such ethylene polymer, the temperature at which the homolytic breakdown of such peroxides into peroxy radicals begins is too low for good working of the ethylene polymer as is necessary for extrusion purposes. While it is possible despite this fact to manufacture cross-linked ethylene polymer, by means of rollers, for example, extrusion presents great difficulties or is entirely impossible to attain in the case of many mixtures of foamable materials. The cross-linking, if it has progressed too far, so modifies the plastic mass being worked that when the mass leaves the worm threads and enters the extrusion die, such mass no longer can be united adequately into a ribbon form, whereupon a lumpy and crumbly product is ejected by the extrusion machine.

In the case of extrusion of cross-linked ethylene polymer foams, therefore, care must be taken to see that the cross-linking is performed as late as possible, and preferably in the extrusion die. With the usual cross-linking agents, however, a complete cross-linking during the short time it takes the mass to pass through the die is practically impossible to achieve. In order to give the material such a high rigidity that the foam mass coming from the die is stable in form, the cross-linking must have progressed so far in the extruding cylinder of the machine that good working and forming is still possible.

It is an object of the present invention to overcome the foregoing drawbacks and to provide for the continuous manufacture of a cross-linked ethylene polymer foam using an extruder.

It is another object of the present invention to provide a process for the continuous manufacture of ethylene polymer-containing foams by extrusion of ethylene polymer-containing material in admixture with a propellant and a cross-linking agent, such that the plastic mass is not lumpy and crumbly, but rather in the form of a smooth ribbon.

It is a further object of the present invention to provide a process of the foregoing type in which the ethylene polymer-containing material is worked in swelled form with the propellant and cross-linking agent, such that temperatures of admixing the ingredients can be below the starting point of the used crosslinking agents, and such that the extrusion may be carried out at temperatures between about 100–180° C. depending upon the nature of the ingredients, their proportions, the softening point of the particular used ethylene polymer or the softening point of the swelled compound, etc.

It is a further object of the present invention to provide a process of the foregoing type so as to produce foam objects of comparatively light density, and optionally containing fillers, preferably closed and uniform pores, and having optionally a highly elastic condition.

Other and further objects of the present invention will become apparent from a study of the within specification and accompanying examples.

It has been found in accordance with the present invention that ethylene polymer foams can be manufactured continuously by the extrusion of mixtures of polyethylene and/or ethylene copolymers with propellants and cross-linking agents as well as fillers, if desired, by using as starting materials mixtures of polyethylene and/or ethylene copolymers obtained by swelling the plastic with organic solvents so as to permit the working in of the propellants and cross-linking agents at temperatures below the starting point of the used crosslinking agents, the present known crosslinking agents having starting points near 130° C. in maximum.

Broadly, the present invention relates to a process for the continuous manufacture of ethylene polymer-containing foams by the extrusion of ethylene polymer-containing material in admixture with propellants and cross-linking agents, which comprises carrying out the extrusion of a mixture of such an ethylene polymer, a propellant and a crosslinking agent containing material in the presence of an organic solvent for ethylene polymer. The solvent may have preferably a boiling point above about 40° C., and the solvent may be mixed in together with a filler in the ratio of solvent to filler of 1:1–2. Furthermore, the propellant may be a solid gas-generating substance or a liquid low-boiling substance, and if desired the propellant and cross-linking agent may be added simultaneously after the solvent has been introduced. The ethylene polymer-containing material may comprise a member selected from the group consisting of polyethylene, i.e. either low pressure or high pressure polyethylene, ethylene copolymers, for example those of ethylene and vinyl acetate, and mixtures of polyethylene and ethylene copolymers, etc.

In accordance with one particular embodiment of the invention, an improvement in the process for the continuous manufacture of ethylene polymer-containing foams by the extrusion of the ethylene polymer-containing material in admixture with a gas-generating propellant or blowing agent and a cross-linking agent is provided, the improvement comprising admixing the ethylene polymer containing material with an organic solvent for ethylene polymer to swell the ethylene polymer, then admixing therein at a temperature below the starting point of the used crosslinking agent the propellant and the cross-linking agent, and carrying out the extrusion with the resulting mass at a temperature between about 100–180° C. and above the softening point of the swelled compound. Preferably the solvent is used in an amount between about 3–10% by weight based upon the quantity of ethylene polymer present in the ethylene polymer-containing material used. Generally, the resulting mass containing the propellant and crosslinking agent is maintained at a sufficient elevated pressure to prevent demixing of any attendant gas from the mass prior to extrusion. The ethylene polymer-containing material should be in flowable softened condition by reason of the presence of the organic solvent and the temperature utilized.

In accordance with the present invention, the solvent for swelling the polyethylene and/or ethylene copolymer is selected from the group consisting of halogenated aliphatic hydrocarbons, aliphatic hydrocarbons, halogenated aromatic hydrocarbons, aromatic hydrocarbons, cycloaliphatic hydrocarbons, aliphatic ketones, aliphatic ethers, cycloaliphatic ethers and fatty acid alkyl esters. If desired, the swelling solvent for polyethylene and/or ethylene copolymers can be a mixture of two or more single, i.e. individual solvents, which are compatible one with another in the required temperature range. The proportion of the single solvents in the mixture depend on the required properties of the product. The use of solvents in accordance with the foregoing has the advantage over polymeric plasticizers like polyisobutylene for example that the instant solvents evaporate readily during the foaming, depending upon the particular boiling point of the solvent used, and therefore such solvent can diffuse out of the mass to a great extent, i.e. after the extrusion.

Among the solvents which may be used in accordance with the present invention are halogenated hydrocarbons, and especially halogenated aliphatic hydrocarbons, such as trichlorethylene, ethylene chloride, chloroform, methylene chloride, etc.; as well as aliphatic hydrocarbons, including alkanes, and especially lower alkanes, such as benzine ($C_5$–$C_{10}$ hydrocarbons); halogenated aromatic hydrocarbons, such as chlorobenzene etc., as well as aromatic hydrocarbons, such as benzene, toluene, xylene; cycloaliphatic hydrocarbons, including cycloalkanes, such as cyclohexane, etc.; aliphatic ketones, including dialkyl- and especially di-lower alkyl ketones, such as methyl ethyl ketones, acetone, etc.; aliphatic ethers, such as di-n-propyl-ether or methyl glycol acetate; as well as cyclic ethers, such as tetrahydrofurane, fatty acid alkyl esters, including lower fatty acid- lower alkyl esters, such as butyl acetate; etc; and the like mixtures thereof.

If solid, gas-yielding propellants or blowing agents are used, the homogenization of ethylene polymer, filler, if present, solvent, cross-linking agent, and propellant can be performed in various ways. The substances can be mixed cold in a fluid mixer or turbulant mixer and can then be worked into the plasticized polyethylene in a roller-type mixer. Good distribution of the individual additives in polyethylene and/or copolymers thereof may also be achieved with Banbury internal mixers. Finally, an extruder itself can be used for the homogenization. Due to the great adsorptivity of most fillers, it is possible to work the solvent rapidly into the polymer mass. In general, 3 to 20 parts by weight of solvent per 100 parts by weight of polyethylene and/or ethylene copolymer will suffice for the purpose of the present invention. It is recommended, when working with a roller-type mixture, to charge first the filler with the solvent, the filler remaining as sprinkleable as before if no more than 100 parts by weight of solvent are used per 100 parts by weight of filler, although is desired twice as much filler may be present as solvent. During the addition of the solvent-filler mixture to the plasticized ethylene polymer, i.e. in flowable softened condition, the roller temperature can be reduced. It is expedient, however, to work with two differently heated rollers, using the first for the addition of the solvent-filler mixture, and the second, cooler roller for working in the propellant and cross-linking agent. If Banbury internal mixers are used, the appropriate low temperature is used from the beginning, and first a mixture of filler and solvent in a ratio of 1:1 to 2:1 is added to the ethylene polymer, so that a preliminary mixture results, which facilitates further working, and thereafter the propellant and cross-linking agent are added. Also, in the case of a mixing extruder, a sufficiently low temperature setting can be selected at the beginning if provision is made for a sufficient build-up of pressure in the machine to provide the desired over-all conditions needed for extruding a flowable plastic mass of foam-material.

The foamable and cross-linkable mass can be extruded in a temperature range generally between about 100–180° C., which temperature may be set at the extrusion machine itself. The temperature setting is determined by the softening of the swelled compound. To prevent degasification in the direction of the point where the material is fed into the extruder, it is advantageous to select the temperature such that the incoming material fuses as soon as possible after it enters the machine, so that a dense plug is compressed by the worm before the decomposition temperature of the propellant or blowing agent is reached. The temperature of the subsequent heating zones are naturally to be adjusted to the softening range of the mass, the desired degree of cross-linking upon extrusion, and the required pore distribution. In this same connection, the pressure in the extrusion machine must be high enough to prevent any demixing of the gas in the plastic mass so that upon extrusion the foaming will be uniform and the bulk density and cellular structure will be even throughout, as desired.

If liquid, low-boiling organic substances are used as propellants or blowing agents, they are worked into the material, which has already been plasticized by the extruder, i.e. with the ethylene polymer-containing material being in softened flowable condition, through a second inlet in a zone of the worm cylinder, where there is less pressure by reason of more volume, downstream of the inlet of the other ingredients. Such liquid, low-boiling organic substances represent propellants which are fluid gases, and in contrast to the higher-boiling solvents used as swelling agents, do not represent a definite solvent for the polymer or plastic mass, but are nevertheless not incompatible with the polymer at high pressure. Therefore, these propellants can be easily worked into the mass in the desired way.

Conventional organic peroxides may be used in accordance with the present invention as cross-linking agents, preferably dialkyl peroxides and diaralkyl peroxides with tertiary carbon atoms, such as dicumyl peroxide, di-t-butyl peroxide, dicymyl peroxide, 2,5-dimethyl-2,5-di-t-butyl-peroxy-hexane, 2,5-dimethyl-2,5 - di-t-butylperoxy-hexine, cumyl-t-butylperoxide, and the like.

In accordance with the present invention, all conventional inorganic and organic compounds which evolve a propellant gas or foaming gas, such as nitrogen or carbon dioxide, upon pyrolytic decomposition, may be used as propellants or blowing agents. These include, dinitrosopentamethylenetetramine, azodicarbonamide, diphenyl-oxide-4,4'-disulfohydrazide, 5-tert.-butylamino - 1,2,3,4-thiatriazol, etc. Furthermore liquid low boiling substances with a boiling point lower than 40° C. may be used as propellants such as trichloromonofluoromethane, dichlorotetrafluoroethane, dichlorodifluoromethane, etc.

The propellants and cross-linking agents, as aforesaid can be worked into the plasticized polyethylene and/or the copolymers of ethylene simultaneously, if desired, in accordance with the present invention, and generally these materials are added at a temperature below the starting point of the used crosslinking agent.

Fillers which may be optionally present include, for example, carbon black, graphite, metal oxides, such as zinc oxide, aluminum oxide, etc., metal carbonates, metal silicates, and silicic acid, and metal phosphates, and the like.

The copolymer counterpart of ethylene may be vinyl acetate, etc., in the proportions of about 67–55 parts by weight of ethylene, and 33–45 parts by weight of the comonomer, and where such copolymer is used with polyethylene in admixture, about 90 parts by weight of polyethylene may be used with about 10 parts by weight of the copolymer.

The extruded foams produced in accordance with the present invention possess closed, uniformly shaped cells, and the density of the foam articles depends greatly upon on the nature of the filler and the quantity of filler utilized.

The following examples are set forth by way of illustration and not limitation.

EXAMPLE 1

100 parts by weight of high-pressure polyethylene (specific gravity 0.92; melting index $i_2=1.5$) are plasticized at 130° C. on a two-roll roller mill and a mixture of 10 parts by weight of carbon black and 5 parts by weight of xylene are slowly added. The rolled sheet is then shifted to a two-roll mill with a roller temperature of 110° C., where the addition takes place of 8 parts by weight of stearic acid, 5 parts by weight of dinitrosopentamethylenetetramine and 2 parts by weight of dicumyl peroxide. The mass is rolled to a thin sheet and granulated after it becomes cool. The extrusion of the foamable and cross-linkable mixture takes place in an extruding machine. The screw is of 45 millimeters in diameter and 18 D in length. The temperatures of the individual heating zones are maintained such that a mass temperature results of 165–170°. After the mass is ejected from the die, a spontaneous swelling takes place at reduced pressure. The foam body passes through a heating zone connected directly with the extrusion machine, so that the extruded foam does not lose its temperature and therefore the cross-linking process is completed in the desired way. The cellular body has a density of 0.08 g./cc. and uniform, small, closed pores, or cells. The foam body is insoluble in boiling xylene.

EXAMPLE 2

100 parts by weight of high-pressure polyethylene (specific gravity 0.92; melting index $i_2=1.5$) are thoroughly mixed in three separate procedures with 20 parts by weight of silicic acid, zinc oxide, and aluminum oxide, respectively, as bright fillers, and in each procedure furthermore with 5 parts by weight of methyl ethyl ketone, 10 parts by weight of azodicarbonamide, 1 part by weight of urea, and 2 parts by weight of 2,5-dimethyl-2,5-(ditert.-butyl-peroxy)-hexane, in a fluid mixer, and in each case the mixture which results is then thoroughly homogenized in an extruding machine at a mass temperature no higher than 130° C., and extruded into granulatable strings. The further processing of the substances obtained in each procedure is performed as described in Example 1 in order to attain the desired foam product. The density of the cellular body produced in each instance is between 0.1 and 0.2 gram per cubic centimeter, depending upon the nature of the filler used.

EXAMPLE 3

90 parts by weight of high pressure polyethylene (specific gravity 0.92; melting index $i_2=1.5$) are worked in a Banbury internal mixer with a floating weight at 110° C. together with 10 parts by weight of a copolymer of 55% ethylene and 45% vinyl acetate, 10 parts by weight of carbon black, 5 parts by weight of trichloroethylene, 10 parts by weight of diphenyl-oxide-4,4'-disulfohydrazide and 2 parts by weight of dicumyl peroxide, to form a homogeneous, plastic mass, which, after cooling, is reduced in a crushing machine. The particles obtained are transferred to an extrusion machine and the extrusion is performed in the same manner as described in Example 1, and similar results are obtained.

EXAMPLE 4

100 parts by weight of a copolymer of 67% ethylene and 33% vinyl acetate, 30 parts by weight of carbon black, 10 parts by weight of methylene chloride, 8 parts by weight of azodicarbonamide, 1 part by weight of urea, 2 parts by weight of 5-tert.-butyl-amino-1,2,3,4-thiatriazol, and 2 parts by weight of tert.-butyl-cumyl peroxide, are worked together in separate procedures in accordance with each of the methods described in Examples 1 to 3, respectively, and then extruded. The foam that is formed in each case is highly elastic, and its density amounts to 0.16 g./cc.

EXAMPLE 5

100 parts by weight of a powdered low-pressure polyethylene (specific gravity 0.95; melting index $i_5=1.5$), 5 parts by weight of carbon black, 20 parts by weight of xylene, 10 parts by weight of azodicarbonamide, 1 part by weight of urea and 2 parts by weight of 2,5-dimethyl-2,5-di(tert.-butyl-peroxy)-hexine are homogenized with one another in a fluid mixer and foamed by means of an extruding machine, and similar results are achieved compared with those of Example 1.

EXAMPLE 6

100 parts by weight of low-pressure polyethylene (specific gravity 0.95; melting index $i_5=1.5$), 5 parts by weight of carbon black, 20 parts by weight of xylene and 2 parts by weight of 2,5 - dimethyl - 2,5 - di-tert.-butyl-peroxy)-hexine are made to foam in an extruding machine with a propellant injecting inlet at a zone of the worm where there is less pressure by reason of more volume. To this end, 12 parts by weight of dichlorotetrafluoroethane as propellant or blowing agent are forced through the injecting inlet, into the already plasticized mass, and are uniformly worked into it along the path to the die. The foam has small, closed pores or cells, and a specific weight of 0.05 g./cc.

EXAMPLE 7

100 parts by weight of low-pressure polyethylene (specific gravity 0.95; melting index $i_5=1.5$) are made to foam with 6 parts by weight of xylene as solvent in an extruding machine as in Example 6. For this purpose, a solution of 25 parts by weight of trichloromonofluoromethane as propellant and 0.9 part by weight of dicumylperoxide as crosslinking agent are forced into the flowable mass and uniformly distributed therein as in Example 6. The extruded, cross-linked foam has small, closed and uniform pores or cells and a specific gravity of 0.05 gram/cc.

It will be appreciated that the instant specification and examples are set forth for the purpose of illustration and not limitation, and that changes and modifications will occur to the artisan which may be made without departing from the spirit and scope of the present invention.

What is claimed is:

1. In the process for the continuous manufacture of ethylene polymer-containing foams by the extrusion of ethylene polymer-containing material in admixture with a gas-generating propellant and a cross-linking agent, the improvement which comprises admixing a ethylene polymer-containing material selected from the group consisting of polyethylene, ethylene copolymer constituting between about 67–55 parts by weight of ethylene and 33–45 parts by weight of the comonomer, and mixtures thereof constituting about 90 parts by weight of polyethylene and about 10 parts by weight of the copolymer, with an organic solvent for ethylene polymer having a boiling point above about 40° C. in an amount between about 3–20 parts by weight per 100 parts by weight of the ethylene polymer-containing material present, to swell the ethylene polymer-containing material and to obtain a low working temperature, then admixing therein a gas-generating propellant selected from the group consisting of a gas-generating solid substance and a low boiling liquid substance having a boiling point below 40° C., and an organic peroxide cross-linking agent, at a temperature below the starting point of the cross-linking agent used, and extruding continuously the resulting mass at a temperature between about 100–180° C. and above the softening point of the ethylene polymer-containing material used.

2. Process according to claim 1 wherein said propellant and cross-linking agent are added simultaneously after said solvent has been admixed with said ethylene polymer-containing material and thereafter the resulting mixture is extruded.

3. Process according to claim 1 wherein said ethylene polymer-containing material is a copolymer of ethylene and vinyl acetate.

4. Improvement according to claim 1 wherein a filler is introduced in admixture with said solvent in a ratio by weight of solvent to filler of 1:1–2, and said admixture is admixed with said ethylene polymer-containing material.

5. Improvement according to claim 1 wherein the resulting mass containing said propellant and cross-linking agent is maintained at a sufficiently elevated pressure to prevent demixing of attendant gas from such mass prior to extrusion.

6. Process for the continuous manufacture of ethylene polymer foam by extrusion of a plastic mass containing ethylene polymer, a propellant and a cross-linking agent, which comprises admixing a ethylene polymer-containing material selected from the group consisting of polyethylene, ethylene copolymer constituting between about 67–55 parts by weight of ethylene and 33–45 parts by weight of the comonomer, and mixtures thereof constituting about 90 parts by weight of polyethylene and about 10 parts by weight of the copolymer, in flowable softened condition with an organic solvent for ethylene polymer having a boiling point above about 40° C. in an amount between about 3–20 parts by weight per 100 parts by weight of the ethylene polymer-containing material present, to swell the ethylene polymer-containing material and to obtain a low working-temperature, then admixing therein a gas-generating propellant selected from the group consisting of a gas-generating solid substance and a low boiling liquid substance having a boiling point below 40° C., and an organic peroxide cross-linking agent, at a temperature below the starting point of the cross-linking agent used, all of said admixing being carried out at a sufficiently elevated pressure to prevent demixing of attendant gas from the resultant mixture prior to extrusion, and extruding continuously the resulting plastic mass at a temperature between about 100–180° C. and above the softening temperature of the ethylene polymer-containing material used.

7. Process according to claim 6 wherein a filler is introduced in admixture with said solvent in a ratio by weight of solvent to filler of 1:1–2, and said admixture is admixed with said ethylene polymer-containing material.

8. Process according to claim 6 wherein said solvent is selected from the group consisting of halogenated aliphatic hydrocarbons, aliphatic hydrocarbons, halogenated aromatic hydrocarbons, aromatic hydrocarbons, cycloaliphatic hydrocarbons, aliphatic ketones, aliphatic ethers, cycloaliphatic ethers, fatty acid alkyl esters, and mixtures thereof, which have a boiling point above about 40° C.

References Cited

UNITED STATES PATENTS 3,250,731   5/1966   Buhl et al.
3,098,832   7/1963   Pooley et al.

FOREIGN PATENTS 899,389   6/1962   Great Britain.

SAMUEL H. BLECH, *Primary Examiner.*

W. J. BRIGGS, SR., *Assistant Examiner.*

U.S. Cl. X.R.

260—2.5, 94.9; 264—54

UNITED STATES PATENT OFFICE

CERTIFICATE OF CORRECTION

Patent No. 3,452,123　　　　　　　　Dated June 24, 1969

Rolf Beckmann
Karl-Heinz Kleefisch
Wolfgang Dobrikat

It is certified that errors appear in the above-identified patent and that said Letters Patent are hereby corrected as shown below:

Column 4, line 7, insert --and-- before "mixtures; line 12, "turbulant" should read --turbulent--; line 27, "is desired" should read --if desired--. Column 6, line 66, inser an opening parenthesis before "tert." Column 8, line 47, inse --Aykanian et al, 3,160,688, Dec. 1964.--

SIGNED AND
SEALED
MAR 17 1970

(SEAL)
Attest:

Edward M. Fletcher, Jr.
Attesting Officer

WILLIAM E. SCHUYLER, JR
Commissioner of Patents